United States Patent
Mosur et al.

(10) Patent No.: US 7,266,647 B2
(45) Date of Patent: *Sep. 4, 2007

(54) LIST BASED METHOD AND APPARATUS FOR SELECTIVE AND RAPID CACHE FLUSHES

(75) Inventors: Lokpraveen B. Mosur, Worcester, MA (US); Harikrishna B. Baliga, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/280,585

(22) Filed: Nov. 15, 2005

(65) Prior Publication Data

US 2006/0075194 A1    Apr. 6, 2006

Related U.S. Application Data

(63) Continuation of application No. 09/967,031, filed on Sep. 27, 2001, now Pat. No. 6,965,970.

(51) Int. Cl.
*G06F 12/00*    (2006.01)

(52) U.S. Cl. .................. 711/135; 711/144; 711/118; 711/141

(58) Field of Classification Search ............... 711/135, 711/118, 119, 143, 146, 144, 141
See application file for complete search history.

(56) References Cited

U.S. PATENT DOCUMENTS

| | | | |
|---|---|---|---|
| 5,724,550 A * | 3/1998 | Stevens ..................... | 711/146 |
| 5,761,501 A * | 6/1998 | Lubbers et al. ............ | 707/100 |
| 5,860,100 A | 1/1999 | Feiste et al. ................ | 711/135 |
| 5,860,105 A * | 1/1999 | McDermott et al. ........ | 711/135 |
| 6,058,456 A | 5/2000 | Arimilli et al. ............. | 711/129 |
| 6,122,711 A | 9/2000 | Mackenthun et al. ....... | 711/135 |
| 6,272,033 B1 * | 8/2001 | Watt ........................... | 365/49 |
| 6,418,515 B1 | 7/2002 | Kurosawa ................... | 711/135 |
| 6,460,122 B1 | 10/2002 | Otterness et al. .......... | 711/154 |
| 6,470,422 B2 | 10/2002 | Cai et al. ..................... | 711/129 |
| 6,490,657 B1 | 12/2002 | Masubuchi et al. ........ | 711/135 |

* cited by examiner

*Primary Examiner*—Kimberly McLean-Mayo
(74) *Attorney, Agent, or Firm*—Kenyon & Kenyon LLP

(57) ABSTRACT

An apparatus and a method for rapidly flushing a cache memory device, including a list structure to track changes in a cache, which may be implemented on the processor die separate from the cache memory. The list structure allows for access to a relatively small store of data to determine whether or not a cache entry needs to be written to the main memory. Choosing the format of the list structure, allows one to make tradeoffs between area needed on a chip and the amount of efficiency in the cache flushing process.

14 Claims, 9 Drawing Sheets

LIST BASED METHOD AND APPARATUS FOR SELECTIVE AND RAPID CACHE FLUSHES

RELATED APPLICATIONS

This application is a Continuation of prior application U.S. Ser. No. 09/967,031 filed on Sep. 27, 2001, and will issue as U.S. Pat. No. 6,965,970 on Nov. 15, 2005.

BACKGROUND OF THE INVENTION

One constraint on the increased performance of computer systems is often the time it takes to access data from memory. This is because processors such as central processing units (CPUs) and graphics processors typically run at much higher speeds than the main memory, which often means there are delays caused by the memory. It typically takes many clock cycles to retrieve data from the main memory, which tends to decrease the overall system performance.

Most computer systems use one or more caches to store some data closer to the processor, so that data can be accessed faster than the main memory. Computer systems may include a hierarchy of cache memories with the smallest and the fastest located closest to the CPU, and with each higher-level cache containing all of the data in the level below. In the present disclosure, lower level caches will refer to those caches closer to the processor. Retrieving data from a cache, instead of from the main memory, reduces the number of clock cycles a processor must wait for data and tends to increase the throughput of the computer system. However, given the relatively small size of the cache, or caches, compared to the main memory, it is not always possible to retrieve data from the cache and avoid reading it from the main memory. In multiple level cache systems the data might only be available in a second or third level cache, in which case data retrieval is typically still faster than from the main memory, although not as fast as from the lower level cache.

An inherent problem in computer systems using multiple levels of cache is ensuring that any modifications or "writes" to the lower level cache are consistently updated in the higher level caches, and to the main memory, so that if the data is needed later only the latest version of the data is retrieved. Two general approaches to the problem of cache writing are often used: write-through and write-back. Write-through involves writing the changed data to main memory, and to all levels of the cache hierarchy. Write-back is a technique by which any modifications or "writes" are tracked only to the lower level cache and not written to main memory, or higher levels of cache, until the cache entry is replaced. The write-back technique offers some economies by reducing write data traffic to main memory, such as when a particular cache entry is changed many times, at the cost of incurring the additional overhead needed to track changes in the cache data.

There are situations in which all, or a substantial portion of, the cache entries need to be replaced, which may be referred to as flushing the cache. Such flushing requires writing any changed cache entries back and to main memory. In a system with multiple levels of write-back cache hierarchy, flushing of the caches start at the lowest level of cache, followed by the next higher level of cache until all the caches in the hierarchy have been "flushed". All modified data will be written back to higher level of caches and main memory followed by invalidation of the same line in the cache. Many existing cache flushing techniques require two or three cache request micro-operations per line of cache, regardless of whether or not there have been any modifications to the data in a particular line of cache. It would be advantageous to have a method or apparatus to efficiently flush the cache, such as not executing micro-operations for cache data that has not been modified and does not need to be written main memory. For example, systems using fewer than three cache request micro-operations per line being flushed would be desirable. As the size and speed of caches increase, which is a trend that seems likely to continue, the advantage of efficiently flushing becomes even more pronounced.

As will be discussed more fully below, there are many ways of configuring a given size cache through the degree of associativity. It would be advantageous to exploit the associativity of a cache to increase the efficiency of cache flushing. Even better would be to allow the designers and system architects to select among a range of possible cache flushing efficiencies for a given degree of associativity in a cache, effectively allowing for explicit tradeoffs between the speed of cache flushing and the hardware dedicated to achieving that performance.

DETAILED DESCRIPTION

The present invention uses a list structure to track the changes made to caches, which may improve the efficiency of cache flush operations. Prior art systems for flushing a cache do not maintain a list structure separate from the cache. Without the separate list structure, checking status field 24 requires a query of the cache, or caches, on a line by line basis. Caches may be configured in a variety of ways, particularly with respect to the degree of associativity.

Figure 1A:
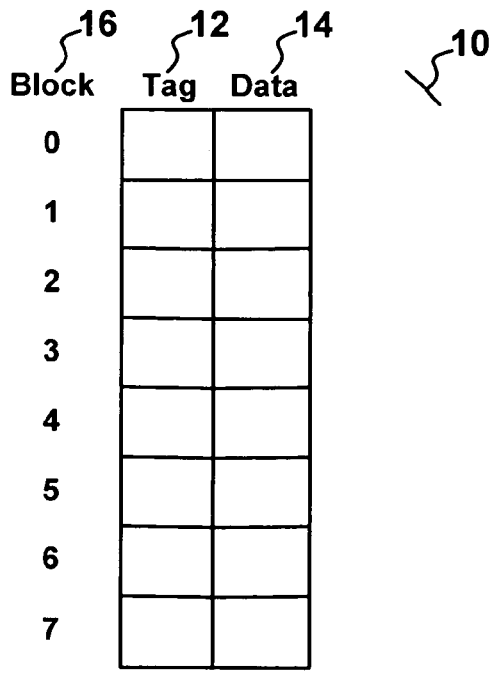
FIGS. 1A-1E illustrate various prior art cache architectures.
Figure 1B:
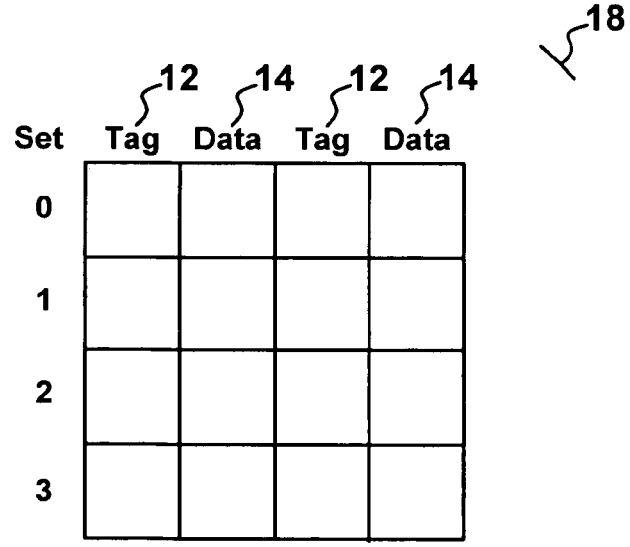
Figure 1C:
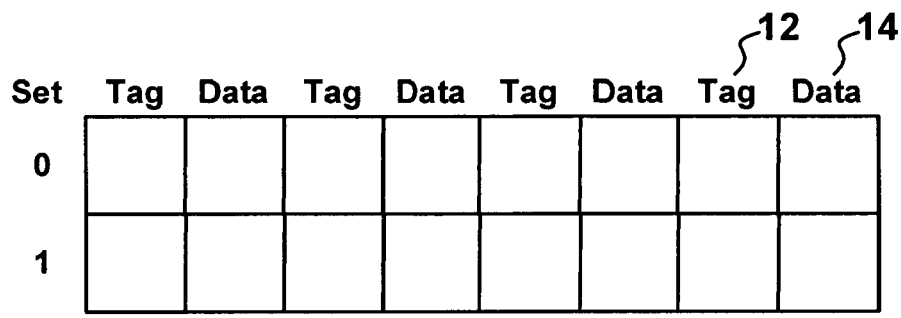
Figure 1D:
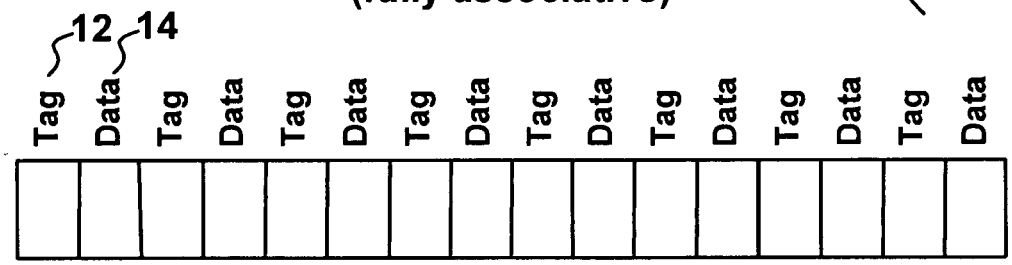
Figure 1E:
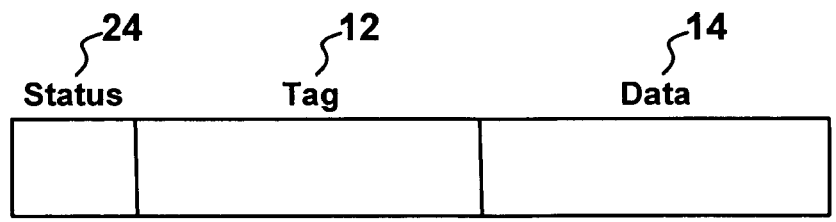

FIGS. 1A-1D illustrate four different cache architectures that might be used for storing eight blocks, or lines, of data in cache. FIG. 1A illustrates the organization of a single cache entry comprised of a tag 12, to identify the data storage location in main memory, and a data field 14, containing the actual data stored. Those of ordinary skill in the art will recognize that mapping memory locations to a particular block 16 based on its address in memory allows for efficient addressing and searching. FIG. 1B also contains the eight blocks of data, but in a two-way set associative cache 18. Cache 18 has four sets, 0 through 3, each of which holds two cache entries (way0 and way1). Again, each cache entry is comprised of a tag 12 and data field 14. FIG. 1C illustrates a four-way set associative cache 20, with two sets, 0 and 1, containing a total of eight cache entries. Cache 20 has four cache entries per set, each of which with a tag 12 and data Field 14 (way0, way1, way2, and way3). FIG. 1D illustrates an eight-way, or fully associative, cache 22 containing the eight cache entries (way0, way1, way2, way3, way4, way5, way6, and way7). In addition to tag 12 and data field 14, most cache schemes also include a status field 24, as shown in FIG. 1E, for each cache entry. In this way the current status, such as whether or not the data in the cache currently matches that in higher level caches or the main memory, can be tracked. Status field 24 may be a single bit indicating whether or not the data is valid, and is also often referred to as a "dirty bit." Those of ordinary skill in the art will quickly recognize the tradeoffs between individual data block status and entire set status fields 24.

Increasing the degree of associativity, for a given number of sets, may increase the chance that a particular data field will be present in the cache, thereby decreasing the number of cache misses. The tradeoff for the higher degree of associativity is that more processing is required when searching the cache. Currently, there is a trend towards higher degrees of associativity. The present invention allows for a range of embodiments so that tradeoffs can be made between cache flushing speed and the amount of overhead that will be required by the list structure for caches with two-way or higher degrees of associativity. The cache flush technique taught by the present invention may also be used with any, or all, caches in a multi-level cache hierarchy system.

There are cache architectures in which the status 24 of a cache entry may require more than a single bit. For example, in systems where multiple processors are sharing a cache, four cache status states such as modified, exclusive, shared, and invalid, might be used (the MESI protocol). Under MESI, modified refers to a cache entry that differs from that in main memory, and belongs to the execution engine. That is, the memory no longer reflects the current data value, as it is stored in cache. Exclusive means the contents of the cache are the same as those in main memory, and belong to the execution engine. Shared means that multiple agents are sharing the cache entry, and before modifying the cache entry, the execution engine will need to invalidate other copies elsewhere. Invalid indicates that the contents of a main memory address are not stored in the cache. The four status states of the MESI protocol can be tracked with two bits, and one could easily extend such a system to track virtually any number of cache states. The present disclosure will use the four states of the MESI protocol to illustrate embodiments of the present invention, however, the present invention is not intended to be limited to any particular number of states or cache state protocol.

Figure 2:
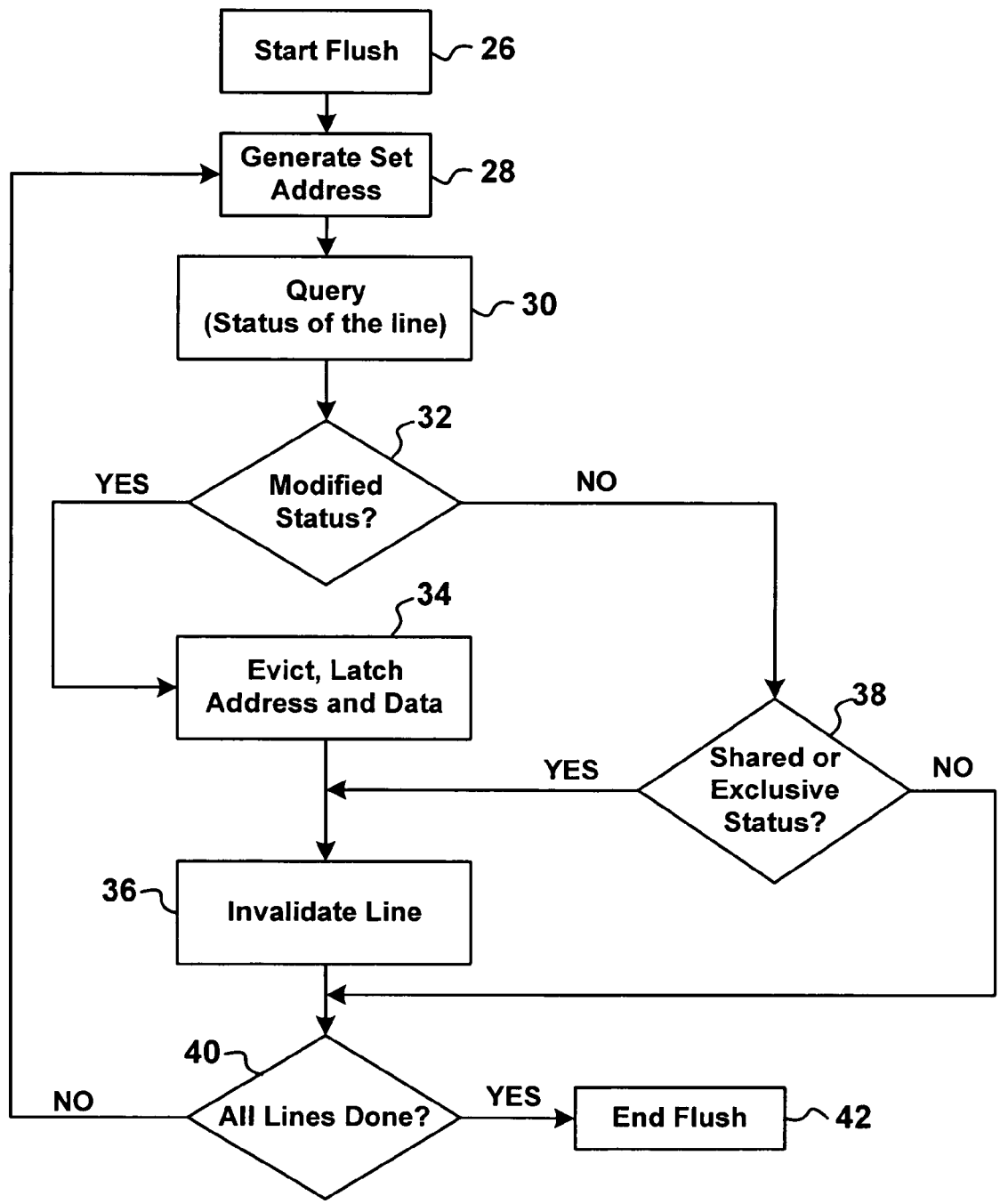
FIG. 2 is a flow chart of a prior art cache flushing procedure.

FIG. 2 shows a flowchart of a prior art cache flush procedure. The start flush 26 procedure begins by generating a set of addresses 28 for the query 30 procedure. If the cache entry has been modified 32, the data, and the memory address, is latched 34 to write back to main memory, and any higher level caches that might be present, and the status is changed to invalid 36. If the cache data is not shared or exclusive 38, nothing further is required, and the process can loop back 40 until the entire cache is flushed 42. To flush each modified cache line it would typically require all the three cache request micro-operations: query 30, evict 34 and invalidate 36. Note that the sequence of evict 34 and invalidate line 36 processes might vary in some implementations by evicting modified data, and leaving the cache in an exclusive state without the cache entry being labeled invalid if the status was shared or exclusive. With this variation, the status is changed to exclusive if the line was modified, after writing back the modified data to main memory or a higher level of cache. There is no need to actually erase data 14 when the cache is flushed. If data 14 has been modified in the cache, then data 14 needs to be "evicted", or written to the proper location in memory. However, as long as status field 24 is reset, nothing is gained by resetting the data 14 field to zero or any other value.

The flush routine in FIG. 2 requires access to the cache itself during each query 32. This cache access step may be avoided, or the total number of cache accesses is reduced, with the present invention. Instead, the list structure(s), which are preferably located separate from the cache(s), maintain and track the status of the cache. That is, the equivalent of a status field 24, or the dirty bit, of each cache line is kept separate from the cache. With a separate list structure, queries of which data fields 14 have been modified can all be carried out simultaneously on the list structure, eliminating the need to check each individual cache entry. The present invention does not, however, require that the architecture of the cache itself be altered. For example, a cache could still have a status field 24, whether or not it was used, and work well with the present invention. The ability to maintain such legacy cache formats might be desirable.

Figure 3:
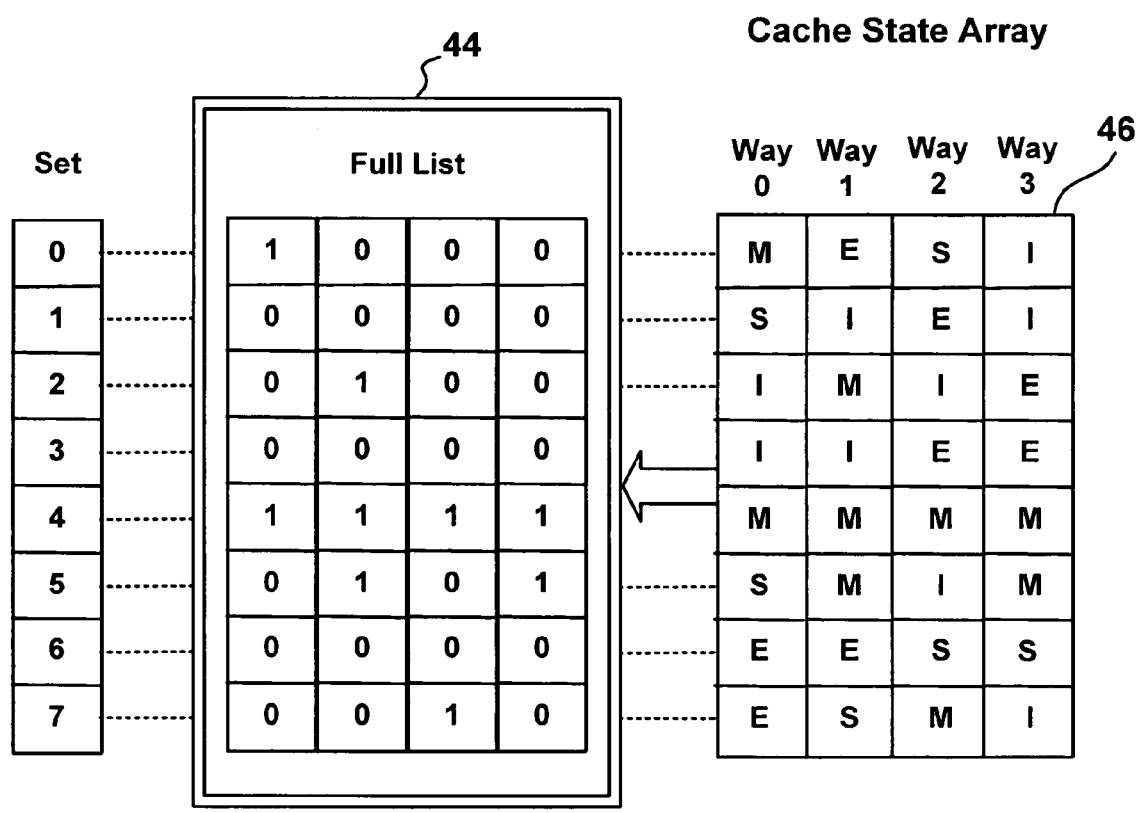
FIG. 3 is a full list structure in accordance with an embodiment of the present invention.

FIG. 3 shows an embodiment of list structure 44 for use with 32 cache entries in an eight-set four-way associative cache 46. Cache 46 in FIG. 3, for clarity, includes only the status of each data entry and uses labels corresponding to the MESI protocol (M—modified, E—exclusive, S—shared and I—invalid). A valid cache entry corresponds to data that has been modified, and need to be written to memory, is denoted by a "1" in list structure 44. An invalid cache 46 entry, those that correspond to status E, S, and I, are denoted with a "0" in list structure 44. The cache entry status is set to valid whenever the corresponding data is modified. When a cache is flushed, all the corresponding cache entries are set as invalid. Throughout this disclosure cache 46 will be used to refer generally to the cache, or caches, although in some illustrations only particularly relevant portions of the cache are shown.

List structure 44 maps the current status of the 32 entries of cache 46 with 32 bits and is arranged in the same set/way structure as the cache. List structure 44 allows the modified cache entries to be determined quickly since there is no need to query the cache to determine the status of the cache line. After determining that status of the cache line from list structure 44, only those cache entries identified as having been modified need to be scheduled for write-back and invalidate. When only a portion of the cache entries have been modified the present invention can allow the cache flushing process to be performed with fewer cache request micro-operations than required by prior art techniques. Preferably, list structure 44 is implemented in random access memory (RAM) with its own decoder. For purposes of the present disclosure the term RAM is intended to be interpreted very broadly. Embodiments of the present invention may implement list structure 44 directly on the die for fast access.

Figure 4:
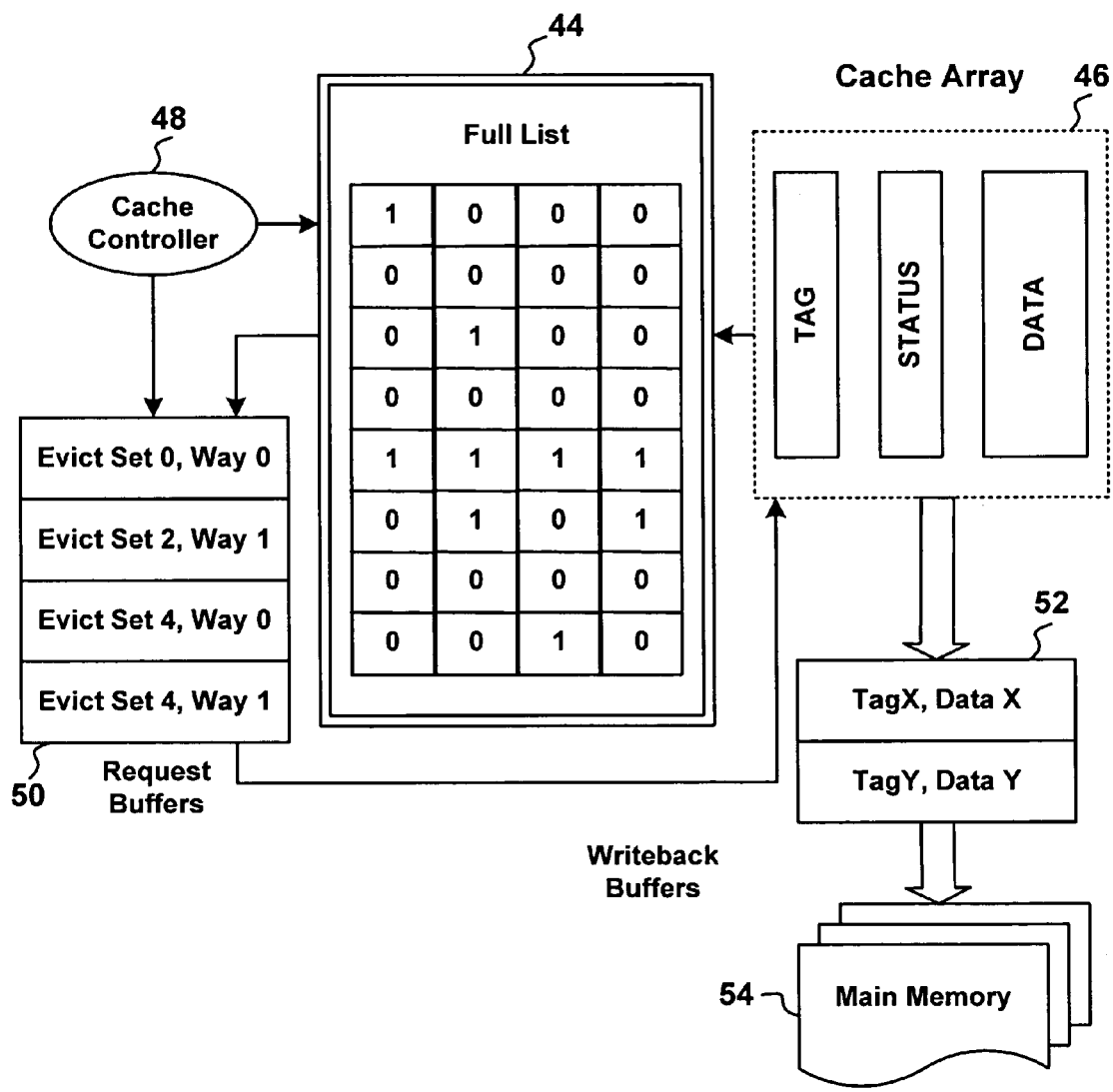
FIG. 4 illustrates a cache flush sequence with a full list structure in accordance with an embodiment of the present invention.

List structure 44 is also shown in FIG. 4 in the context of cache 46, cache controller 48, request buffers 50, write-back buffers 52 and main memory 54, to illustrate how list structure 44 is used in a cache flush procedure. Cache controller 48 can generate evict requests and the set addresses for all the modified lines in cache 46 from list structure 44 alone, without having to directly access cache 46. The evict micro-operations and the set addresses will be stored in request buffers 50 which will issue the evict requests to cache 46. The data and address of the modified cache line will be latched in the write-back buffer. Those of ordinary skill in the art will quickly recognize that accessing the 32 bits of list structure 44 can often be performed significantly faster than the time it would take to query each of the 32 cache entries of cache 46. When list structure 44 is on the die itself, the generation of the evict requests and set address for all the modified lines in cache 46 can be especially quick, at the cost of a relatively small amount of storage on the die. In addition, queries of list structure 44 can be performed in parallel, and along a separate data path, so that the access to cache 46 by other processes, is not blocked.

Although FIG. 4 shows write-back buffers 52 flowing directly into main memory 54, in architectures with multiple levels of cache the write-back would typically take place in each layer of cache between that which is being flushed and main memory 54.

The format of list structure 44 in FIGS. 3 and 4 is referred to as a full list, it fully tracks the status of each cache entry. Full list structure 44 is implemented such that it has the same set/way structure as cache 46. Other embodiments of the present invention allow partial list formats where the size of the list structure is reduced along with some reduction in performance. For implementations that store the list structure on the die, the availability of partial list formats allow designers to explicitly select a level of performance in cache flushing operations, and the corresponding amount of space on the die to achieve that performance. The ability to make such selections might lead to different chip designs based on the level of cache flushing anticipated, the desired speed of performing a cache flush, and the availability of space on the die. The present invention makes such tailoring with respect to cache flushing possible.

Figure 5:
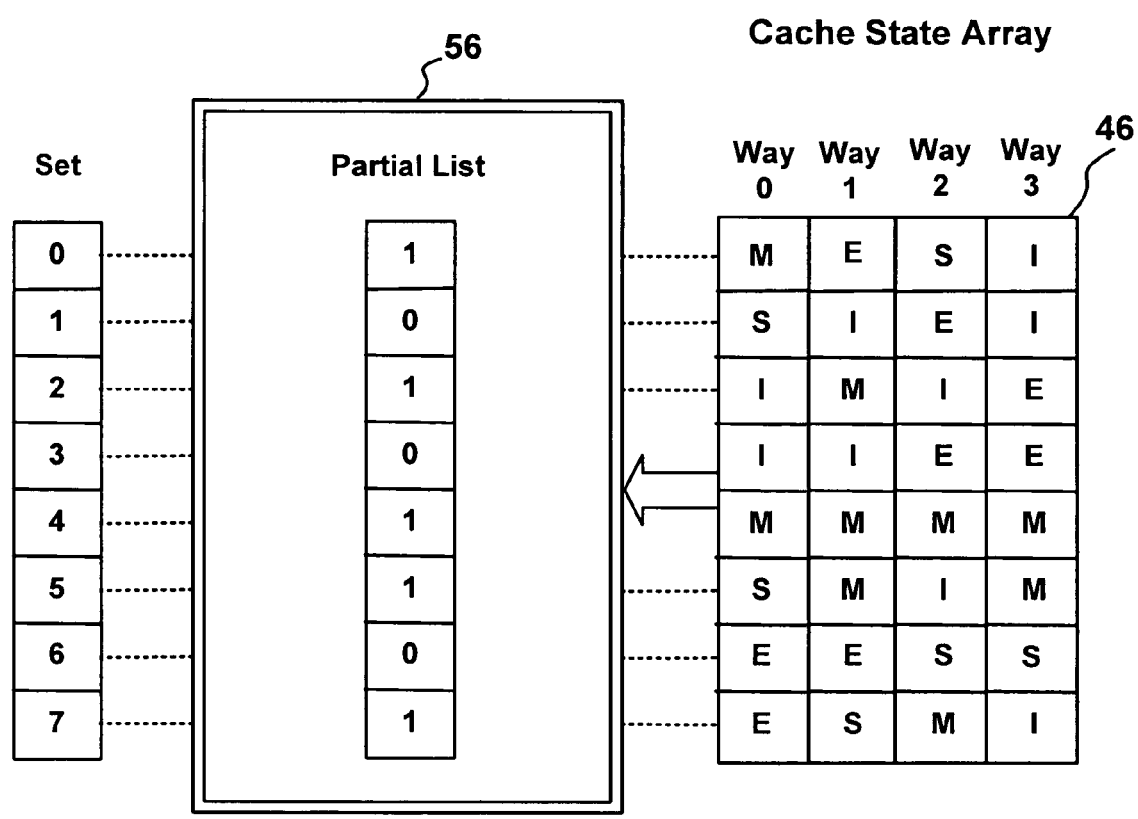
FIG. 5 is a partial list structure in accordance with an embodiment of the present invention.

FIG. 5 illustrates an embodiment of a partial list structure 56 using the same 32 entry cache 46 is FIGS. 3 and 4. Partial list structure 56 uses a single bit per line of cache, for a total of eight bits to represent 32 cache entries. If any of the four ways (0-3) of a cache line are modified, then a single bit is set in partial list structure 56. This embodiment of partial list structure 56 requires at least a two-way set associative cache.

Figure 6:
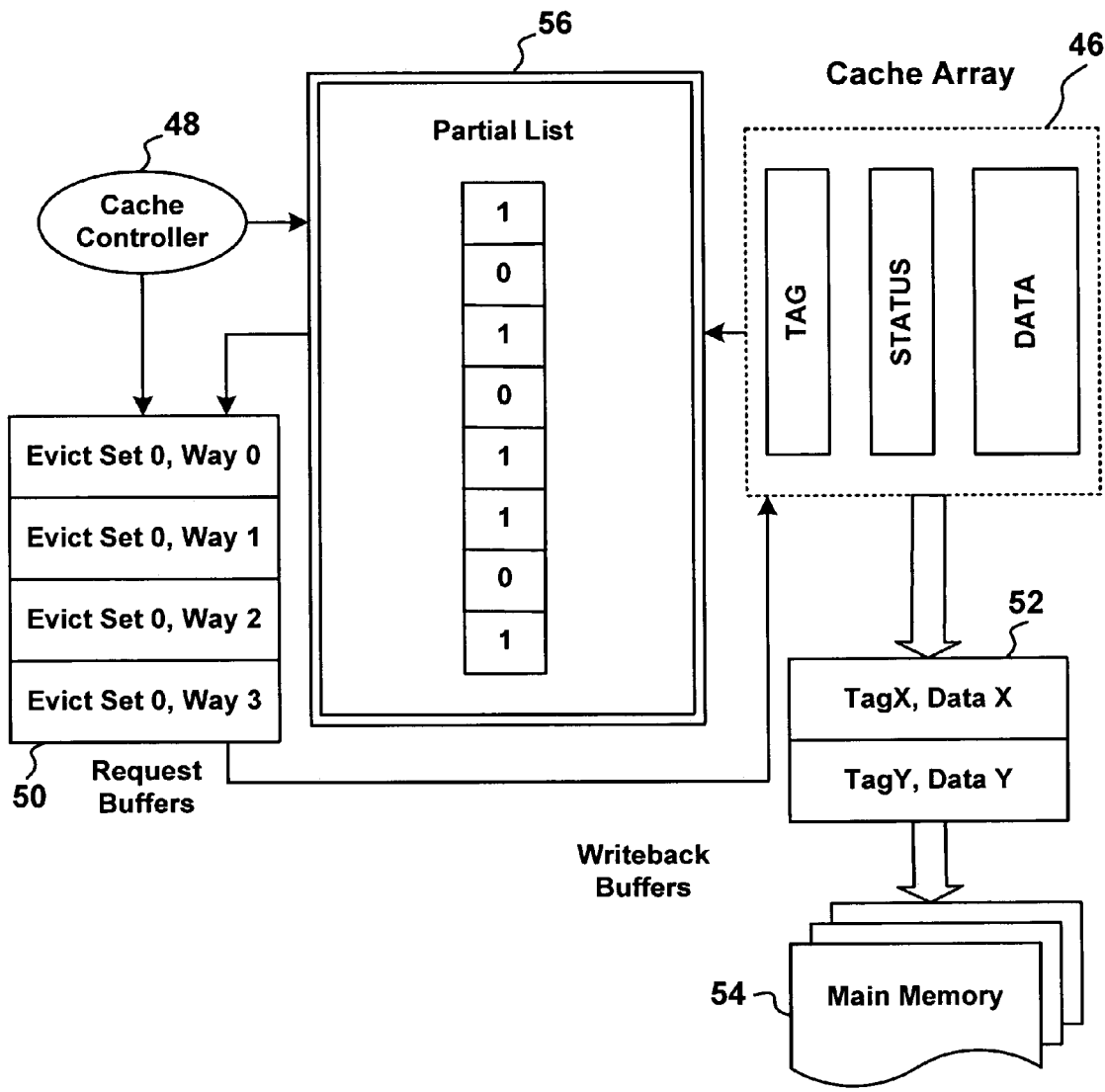
FIG. 6 illustrates a cache flush sequence with a partial list structure in accordance with an embodiment of the present invention.

FIG. 6 illustrates how partial list structure 56 is used in a cache flush operation, and may be compared to FIG. 4, which illustrates the same for a full list structure 44. Note that request buffers 50 with a partial list embodiment evict each of the cache entries (set 0, ways 0 through 3) when a single corresponding entry in partial list 56 is valid. Thus, each valid entry in the partial list will generate in this example, 4 evict requests in request buffer 50. However, for a invalid entry in the partial list structure, as is the case with set 1 in FIG. 6, no evict requests for request buffer 50 are generated. Other embodiments of the present invention may further "filter" the operations in the request buffer 50 and eliminate those corresponding to unmodified cache entries, as determined by status field 24 for the particular cache entry in cache 46.

Table 1 lists the size, in bits, of a partial list structure 56, and a full list structure 44 for various size caches, assuming 32 byte lines and four-way associativity for the cache. The amount of area on a die required to implement each embodiment is nearly proportional to the number of bits required.

TABLE 1

Cache Size Versus Partial/Full List Structure Size

| Cache Size (KB) | Full List (Bits) | Partial List (Bits) |
|---|---|---|
| 16 | 512 | 128 |
| 32 | 1024 | 256 |
| 64 | 2048 | 512 |
| 128 | 4096 | 1024 |
| 256 | 8192 | 2048 |

Of course, the present invention may also be used with cache architectures other than the four-way set associativity illustrated in the examples above.

In another embodiment of the present invention, other levels of partial list structures may be used. For example, it would be possible to design a modified partial list structure similar to that shown in FIG. 5, using two bits per cache line, one for ways 0 and 1, and the other for ways 2 and 3. Such a modified partial list would require half as many bits as the full list column of Table 1. Those of ordinary skill in the art would recognize that there are numerous other possible ways of mapping blocks of data in a cache to a single bit in the partial list structure. The examples discussed above have used the associativity of the cache to map blocks of data to a single bit in the partial list structure. This mapping although logical is not the only way to map blocks of data to a single bit. It is also possible to have a one bit per way in the partial list structure. For example, set 0 way0 through set 7 way 0 may be mapped to a single bit. In this embodiment, 4 bits in partial list structure 56 may be used to track all the lines in the cache.

The present invention is particularly useful in computer architectures where cache flushing is relatively common. Examples include, but are not limited to, systems in which the CPU and the graphics engine share the level 2 cache, multiple processor environments in which the processors share some, or all, of the cache, and systems in which data in a cache must be saved before a change in power source or a system shut down. In such systems, where write-back and cache flushing is relatively common, it might be desirable to incorporate fast cache invalidation or a "one-shot cache invalidation" whereby all cache entries are invalidated simultaneously through specialized hardware. While the specific details of such a device are beyond the scope of the present invention, the present invention may be used in conjunction with such one-shot invalidation to gain further efficiencies.

Figure 7A:
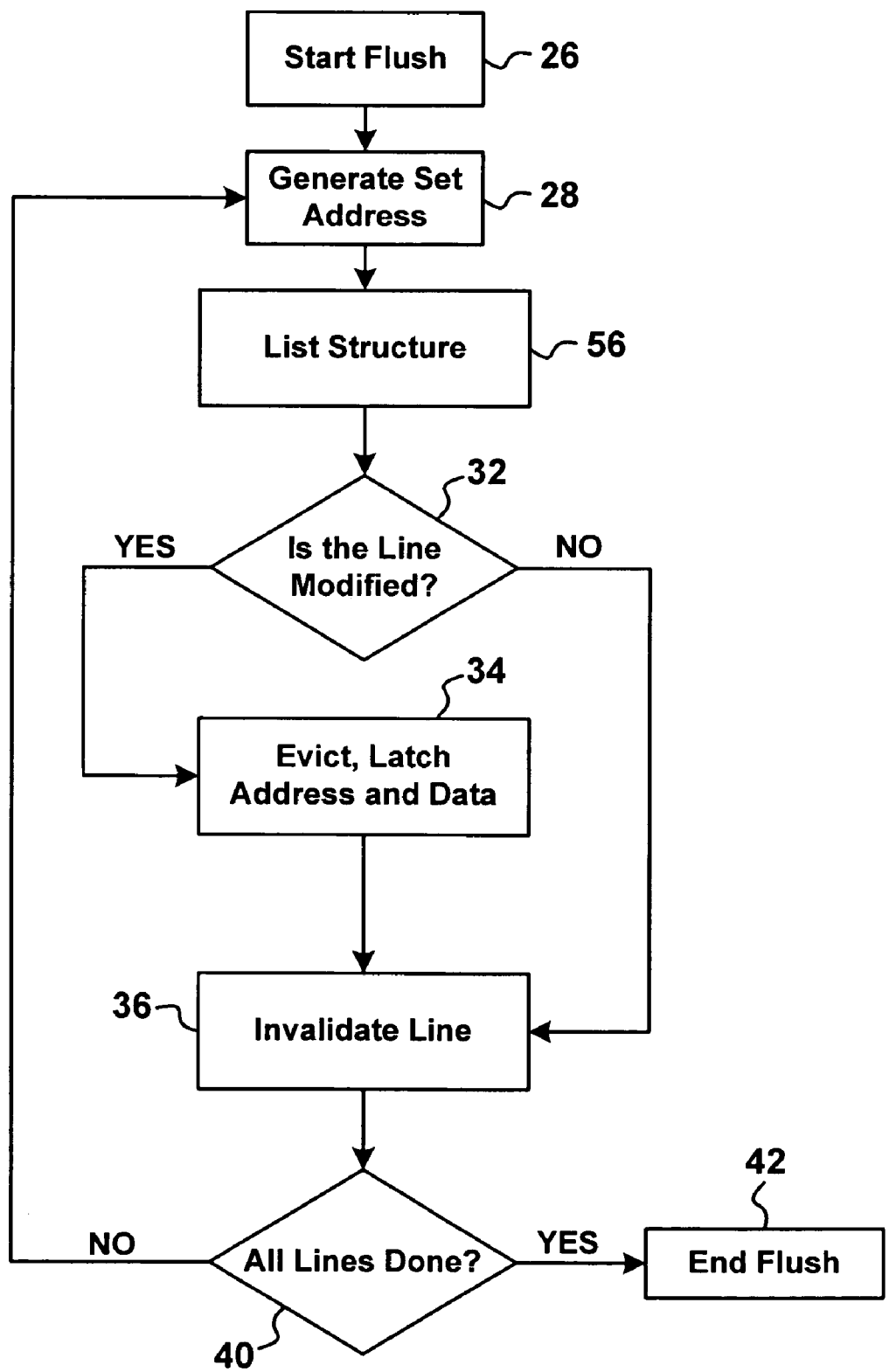
FIGS. 7A-7B are flow charts of a cache flushing procedure in accordance with embodiments of the present invention.
Figure 7B:
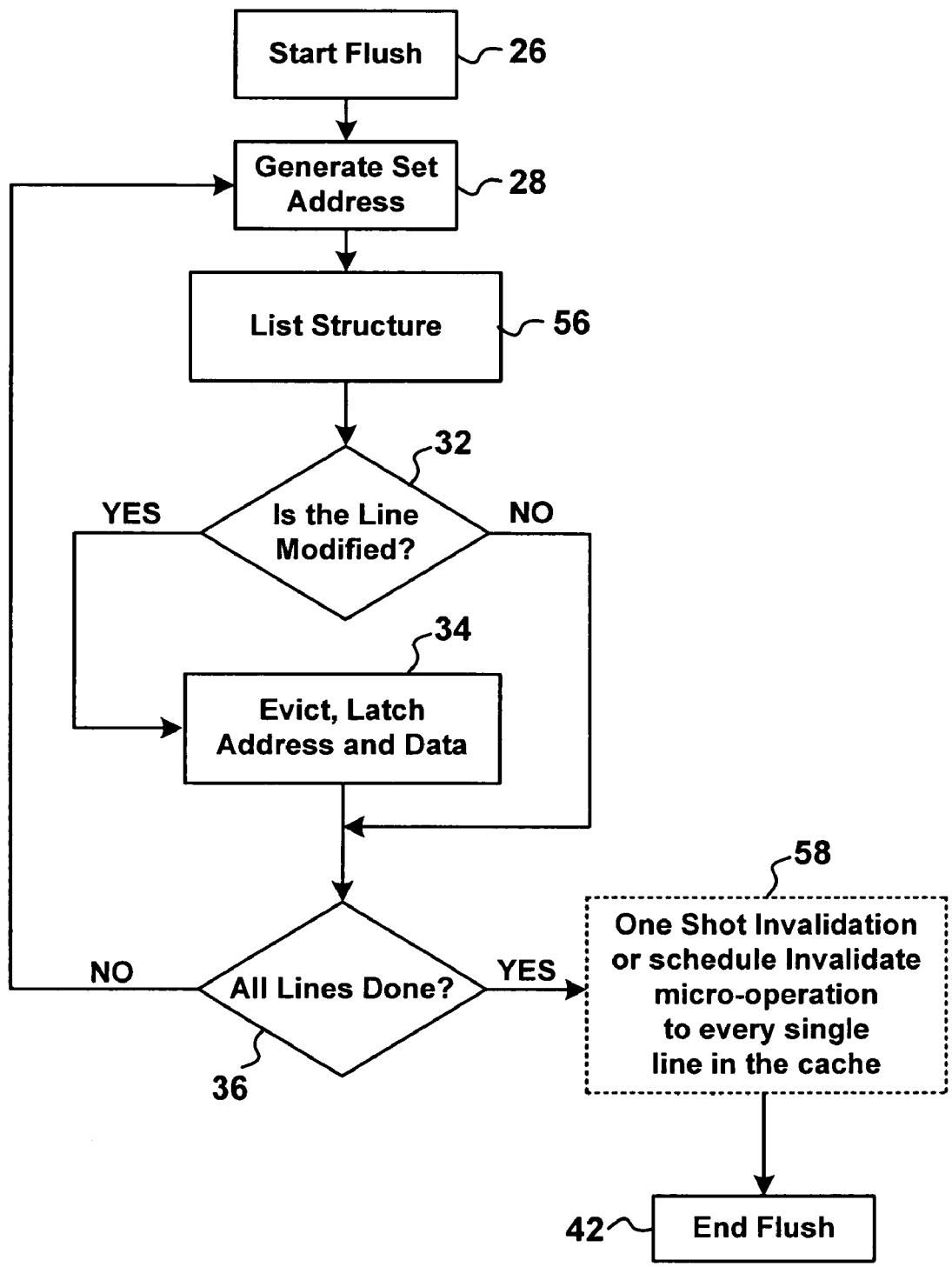

FIGS. 7A and 7B are two flow charts of cache flushing procedures using list structure 56 in accordance with the present invention. Note that while many computer systems have macro-level command to flush and/or invalidate an entire cache, most implement such a command using cache request micro-operations. Minimizing the number of these cache request micro-operations to perform a task is generally desirable. The present invention's use of a list structure eliminates cache request micro-operations on cache entries that have not been modified. Thus, the present invention becomes more efficient, compared to prior art cache flushing techniques, as the percentage of unmodified cache entries increases, as is the case when cache flushes are most frequent. FIG. 7A shows the process without any one-shot invalidation scheme. The process in FIG. 7A uses one to two micro-operations per data entry, in contrast to the two to three required by the prior art process of FIG. 2. The process in FIG. 7B uses a one-shot invalidation scheme 58 to further reduce the total number of micro-operations to one for modified cache entries and zero for those without any modification. That is, invalidation of the cache is performed after all evict micro-operations. This allows the present invention to be better adapted to function in conjunction with a variety of specialized, hardware-based, fast invalidation devices. Embodiments of the present invention are well suited to multiple processor environments with shared caches in which "snoop" commands may be used. The issuance of a snoop initiates a search for the existence of data within a cache, and often stalls the system until the snoop command is serviced. The present invention allows that the list structure be searched to service the snoop, instead of the cache, which may significantly improve the system throughput.

Although the above disclosure provides various embodiments and examples of the present invention for the purposes of illustration, these embodiments and examples are not intended to be an exhaustive list of all possible implementations of the present invention and should not be construed in limiting the present invention. Those of ordinary skill in the art should recognize, with the benefit of the present disclosure, that the present invention may be practiced with many modifications and variations to the specific details of the present disclosure. For example, embodiments of the present invention might be described as being implemented in hardware, while those of ordinary skill in the art will recognize the possibility of a software implementation. In such cases, the present invention is intended to cover hardware and software implementations, and combinations of the two. Similarly, not all the specific details, well-known structures, devices, and techniques that are known to those of ordinary skill in the art have been shown in order to avoid observing the present invention. The present invention is, however, intended to cover a broad range of techniques, devices, and well-known structures. The invention, therefore, is intended to be limited in scope only by the purview of the appended claims.

What is claimed is:

1. An apparatus, comprising:
    a list structure located outside a cache to maintain one bit per a variable number of cache lines representing a status of a plurality of cache entries;
    wherein a logical arrangement of said list structure conforms to said variable number;
    a query mechanism to check said list structure for the state of a cache entry, and
    a cache flush mechanism, logically coupled to said list structure and the cache, to flush a cache entry and for modifying said list structure to reflect a flushed state.

2. The apparatus of claim 1, wherein: said list structure comprises one bit per cache line.

3. The apparatus of claim 1, wherein: said list structure comprises one bit per plurality of cache lines.

4. The apparatus of claim 1, wherein: said list structure comprises one bit per cache way.

5. The apparatus of claim 1, wherein: said variable number is set by an operating system.

6. The apparatus of claim 1, wherein:
    a logical arrangement of said list structure matches an architecture of a cache.

7. The apparatus of claim 1, wherein:
    said cache flush mechanism modifies a cache state responsive to the results of a query of said list structure.

8. The apparatus of claim 7, wherein:
    said cache flush mechanism is logically coupled to a higher level cache for writing back modified data.

9. The apparatus of claim 7, wherein:
    said cache flush mechanism based on said list structure is logically coupled to a higher level cache for evicting modified data.

10. The apparatus of claim 7, wherein:
    said cache flush mechanism is logically coupled to a main memory for writing back modified data.

11. The apparatus of claim 7, wherein:
    said cache flush mechanism is logically coupled to a main memory for evicting modified data.

12. The apparatus of claim 1, wherein: said list structure is located in random access memory (RAM).

13. The apparatus of claim 1, wherein: said list structure is located on a die.

14. The apparatus of claim 1, further comprising:
    a snoop command interpreter to check said list structure in response to a snoop command.

* * * * *